United States Patent
Du et al.

(10) Patent No.: US 11,375,219 B2
(45) Date of Patent: Jun. 28, 2022

(54) CODING METHOD AND SYSTEM WITH IMPROVED DYNAMIC INTERNAL BIT DEPTH

(71) Applicant: Tencent America LLC, Palo Alto, CA (US)

(72) Inventors: Yixin Du, San Diego, CA (US); Xin Zhao, Saratoga, CA (US); Xiang Li, Saratoga, CA (US); Liang Zhao, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 20 days.

(21) Appl. No.: 17/024,687

(22) Filed: Sep. 17, 2020

(65) Prior Publication Data
US 2021/0092420 A1   Mar. 25, 2021

Related U.S. Application Data

(60) Provisional application No. 62/905,325, filed on Sep. 24, 2019.

(51) Int. Cl.
*H04N 19/44*   (2014.01)
*H04N 19/132*   (2014.01)
(Continued)

(52) U.S. Cl.
CPC ........... *H04N 19/44* (2014.11); *H04N 19/105* (2014.11); *H04N 19/117* (2014.11);
(Continued)

(58) Field of Classification Search
CPC .... H04N 19/44; H04N 19/105; H04N 19/117; H04N 19/132; H04N 19/159; H04N 19/184; H04N 19/186; H04N 19/80
See application file for complete search history.

(56) References Cited

U.S. PATENT DOCUMENTS 10,165,288 B2 *  12/2018  Yin ..................... H04N 19/80
2011/0135212 A1 *  6/2011  Alshina ............... H04N 19/176
                                                    382/250
(Continued)

FOREIGN PATENT DOCUMENTS

KR    20110112168 A  * 10/2011 ............. H04N 19/13
WO    WO-2012170833 A1 * 12/2012 ........... H04N 19/124

OTHER PUBLICATIONS

Jonatha Taquet et al., "CE5: Results of tests CE5-3.1 to CE5-3.4 on Non-Linear Adaptive Loop Filter," Joint Video Experts Team (JVET) of ITU-T SG 16 WP 3 and ISO/IEC JTC 1/SC 29/WG 11, Mar. 2019, JVET-N0242. 10 pages.

(Continued)

*Primary Examiner* — Dave Czekaj
*Assistant Examiner* — Shanika M Brumfield
(74) *Attorney, Agent, or Firm* — Anova Law Group, PLLC (57) ABSTRACT

A video decoding method includes obtaining an encoded bitstream of an original video content, and obtaining signaling information associated with the encoded bitstream. The signaling information includes at least a sequence parameter set (SPS), which includes a parameter bit_depth_luma_minus8, which specifies a bit depth of samples of a luma array and a value of a luma quantization parameter range offset; and a parameter bit_depth_chroma_minus8, which specifies a bit depth of samples of a chroma array and a value of a chroma quantization parameter range offset. The method also includes determining an internal bit-depth K for adjusting the bit depth specified by the bit_depth_luma_minus8 and the bit depth specified by the bit_depth_chroma_minus8; performing a decoding process on the encoded bitstream, based the signaling information and using the bit_depth_luma_minus8 and the bit_depth_chroma_minus8, (Continued)

together with the internal bit-depth K, to recover the original video content; and presenting the original video content.

17 Claims, 6 Drawing Sheets

(51) Int. Cl.
    *H04N 19/105*    (2014.01)
    *H04N 19/184*    (2014.01)
    *H04N 19/80*     (2014.01)
    *H04N 19/117*    (2014.01)
    *H04N 19/186*    (2014.01)
    *H04N 19/159*    (2014.01)

(52) U.S. Cl.
    CPC ......... *H04N 19/132* (2014.11); *H04N 19/159* (2014.11); *H04N 19/184* (2014.11); *H04N 19/186* (2014.11); *H04N 19/80* (2014.11)

(56) References Cited

U.S. PATENT DOCUMENTS

| | | | |
|---|---|---|---|
| 2012/0014455 A1* | 1/2012 | Joshi | H04N 19/184 375/240.18 |
| 2012/0087411 A1* | 4/2012 | Haskell | H04N 19/86 375/240.16 |
| 2012/0224098 A1* | 9/2012 | Lou | H04N 19/523 348/441 |
| 2013/0195205 A1* | 8/2013 | Wang | H04N 19/174 375/240.26 |
| 2013/0259118 A1* | 10/2013 | Fu | H04N 19/177 375/240.02 |
| 2015/0063467 A1* | 3/2015 | Hendry | H04N 19/70 375/240.26 |
| 2017/0064336 A1* | 3/2017 | Zhang | H04N 19/122 |
| 2020/0366940 A1* | 11/2020 | Lim | H04N 19/82 |
| 2021/0120237 A1* | 4/2021 | Filippov | H04N 19/105 |
| 2021/0274201 A1* | 9/2021 | Xu | H04N 19/96 |
| 2021/0368178 A1* | 11/2021 | Xu | H04N 19/433 |

OTHER PUBLICATIONS

Benjamin Bross et al., "Versatile Video Coding (Draft 6)", Joint Video Experts Team (JVET) of ITU-T SG 16 WP 3 and ISO/IEC JTC 1/SC 29/WG 11, Jul. 2019, JVET-O2001-vE. 455 pages.

* cited by examiner

CODING METHOD AND SYSTEM WITH IMPROVED DYNAMIC INTERNAL BIT DEPTH

RELATED APPLICATION

This application claims priority to U.S. provisional patent application No. 62/905,325, filed on Sep. 24, 2019, which is incorporated by reference in its entirety.

FIELD OF THE TECHNOLOGY

This application relates to the field of video coding technologies and, specifically, to a coding method and system with improved dynamic internal bit depth.

BACKGROUND

Versatile Video Coding (VVC), also known as H.266, MPEG-I Part 3 and Future Video Coding (FVC), is a developing video compression standard. In October 2015, the MPEG and VCEG formed the Joint Video Exploration Team (JVET) to evaluate available compression technologies and study the requirements for a next-generation video compression standard. The VVC standard is still developing, and new features and improvements still need to be added.

Under current coding standards, for software optimization of a video codec, single instruction multiple data (SIMD) technology which can process multiple data in one single instruction is widely used. The SIMD utilizes the 128-bit or 256-bit registers available in general-purpose CPUs to accomplish multiples 8-bit/16-bit/32-bit/64-bit arithmetic in one instruction, so the calculation can be done in parallel. For example, a 128-bit register can perform sixteen 8-bit or eight 16-bit additions/multiplications within one SIMD instruction. However, for 10-bit internal data, a 128-bit SIMD has to treat it as 16-bit data, and can only perform eight 10-bit additions/multiplications within one SIMD instruction. Therefore, given a huge amount of calculations, 10-bit arithmetic is roughly 2× slower than 8-bit arithmetic using SIMD instructions, which is often less desired. On the other hand, for hardware implementation of a video codec, the increase of internal bit-depth can lead to an increase of various internal buffers and memory bandwidth, which is also less desired.

Thus, according to the present disclosure, it is noted that increased internal bit depth contributes differently to different coding modules for the coding gain, so it may be desirable to configure the internal bit depth for different module separately. The disclosed methods and systems are directed to solve one or more problems set forth above and other problems.

SUMMARY

One aspect of the present disclosure includes a video decoding method. The method includes obtaining an encoded bitstream of an original video content, and obtaining signaling information associated with the encoded bitstream. The signaling information includes at least a sequence parameter set (SPS), which includes: a parameter bit_depth_luma_minus8, which specifies a bit depth of samples of a luma array and a value of a luma quantization parameter range offset; and a parameter bit_depth_chroma_minus8, which specifies a bit depth of samples of a chroma array and a value of a chroma quantization parameter range offset. The method also includes determining an internal bit-depth K for adjusting the bit depth specified by the bit_depth_luma_minus8 and the bit depth specified by the bit_depth_chroma_minus8; performing a decoding process on the encoded bitstream, based the signaling information and using the bit_depth_luma_minus8 and the bit_depth_chroma_minus8, together with the internal bit-depth K, to recover the original video content; and presenting the original video content.

Another aspect of the present disclosure includes a terminal. The terminal includes a memory storing computer program instructions, and a processor coupled to the memory. When executing the computer program instructions, the processor is configured to perform: obtaining an encoded bitstream of an original video content; obtaining signaling information associated with the encoded bitstream, wherein the signaling information includes at least a sequence parameter set (SPS), and the SPS includes: a parameter bit_depth_luma_minus8, which specifies a bit depth of samples of a luma array and a value of a luma quantization parameter range offset; and a parameter bit_depth_chroma_minus8, which specifies a bit depth of samples of a chroma array and a value of a chroma quantization parameter range offset; determining an internal bit-depth K for adjusting the bit depth specified by the bit_depth_luma_minus8 and the bit depth specified by the bit_depth_chroma_minus8; performing a decoding process on the encoded bitstream, based the signaling information and using the bit_depth_luma_minus8 and the bit_depth_chroma_minus8, together with the internal bit-depth K, to recover the original video content; and presenting the original video content.

Other aspects of the present disclosure can be understood by those skilled in the art in light of the description, the claims, and the drawings of the present disclosure.

DETAILED DESCRIPTION

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure.

Certain acronyms and terms used in this disclosure are listed as follows. Other acronyms and/or terms not listed may be found from a VVC standard or other related documents.

HEVC: High Efficiency Video Coding
HDR: high dynamic range
SDR: standard dynamic range
VVC: Versatile Video Coding
JVET: Joint Video Exploration Team
CU: Coding Unit
PU: Prediction Unit
MTS: Multiple Transform Selection
EMT: Enhanced Multiple Transform
AMT: Adaptive Multiple Transform
SVT: Spatially Varying Transform
SBT: Sub-block Transform
VPS: Video Parameter Set
PPS: Picture Parameter Set
SPS: Sequence Parameter Set
IDT: Identity transform
TSM: Transform Skip Mode
IBC: Intra Block Copy
LFNST: Low-Frequency Non-Separable Secondary Transform, or Low-Frequency Non-Separable Transform
RST: Reduced-Size Transform
NSST: Non-Separable Secondary Transform
CCLM: Cross-Component Linear Model
ISP: Intra Sub-Partitioning
MIP: Matrix-based Intra Prediction Mode
MRL (or MRLP): Multiple reference line prediction
COT: Compound Orthonormal Transform
KLT: Karhunen-Loève Transform
IBDI: Internal Bit Depth Increase
DPB: Decoded Picture Buffer
MIP: Matrix-based Intra Prediction
CCALF: Cross-Component Adaptive Loop Filter
Bitstream: A sequence of bits, in the form of a NAL unit stream or a byte stream, that forms the representation of coded pictures and associated data forming one or more CVS.
VVC standard: A currently published version (e.g., JVET-R2001) of the Specification of VVC, which is incorporated herein by reference.
Adaptation parameter set (APS): A syntax structure containing syntax elements that apply to zero or more slices as determined by zero or more syntax elements found in slice headers.
Adaptive loop filter (ALF): A filtering process that is applied as part of the decoding process and is controlled by parameters conveyed in an APS.
ALF APS: An APS that controls the ALF process
Chroma: An adjective, represented by the symbols Cb and Cr, specifying that a sample array or single sample is representing one of the two color difference signals related to the primary colors.
Coded picture: A coded representation of a picture comprising VCL NAL units with a particular value of nuh_layer_id within an access unit and containing all CTUs of the picture.
Coding tree block (CTB): An N×N block of samples for some value of N such that the division of a component into CTBs is a partitioning.
Coding tree unit (CTU): A CTB of luma samples, two corresponding CTBs of chroma samples of a picture that has three sample arrays, or a CTB of samples of a monochrome picture or a picture that is coded using three separate colour planes and syntax structures used to code the samples.
Inter prediction: A prediction derived in a manner that is dependent on data elements (e.g., sample values or motion vectors) of one or more reference pictures.
Intra prediction: A prediction derived from only data elements (e.g., sample values) of the same decoded slice without referring to a reference picture.
Luma: An adjective, represented by the symbol or subscript Y or L, specifying that a sample array or single sample is representing the monochrome signal related to the primary colours.
Motion vector: A two-dimensional vector used for inter prediction that provides an offset from the coordinates in the decoded picture to the coordinates in a reference picture.
Parameter: A syntax element of a sequence parameter set (SPS) or picture parameter set (PPS), or the second word of the defined term quantization parameter.
Sequence parameter set (SPS): A syntax structure containing syntax elements that apply to zero or more entire CLVSs as determined by the content of a syntax element found in the PPS referred to by a syntax element found in each picture header.
Syntax element: An element of data represented in the bitstream.
Syntax structure: Zero or more syntax elements present together in the bitstream in a specified order.

Figure 1:
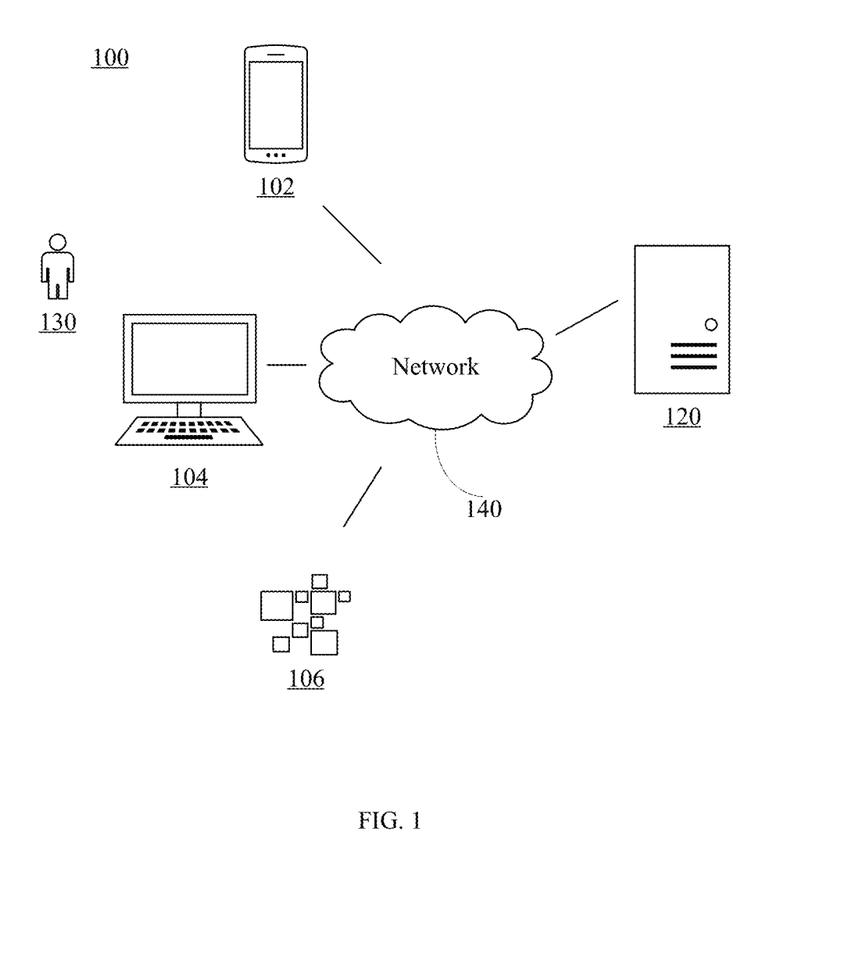
FIG. 1 illustrates an operating environment incorporating certain embodiments of the present disclosure.

FIG. 1 shows an operating environment 100 incorporating certain embodiments of the present disclosure. As shown in FIG. 1, the operating environment 100 may include a variety of devices with video functionalities. For example, the operating environment 100 may include a mobile device 102, a terminal device 104, and an electronic device 106. Other types of devices may also be included.

The operating environment 100 may also include a server 120, one or more users 130, and a communication network 140 connecting the variety of devices and the server 120. The user(s) 130 may use, access, or control one or more of the variety of devices.

The mobile device 102, the terminal device 104, and the electronic device 106 may be generally referred as a terminal device or simply a terminal, which may include any user terminal, such as a personal digital assistant (PDA), a mobile phone, a smart phone, an integrated messaging device (IMD), a tablet computer, a notebook computer, a desktop computer, and other computing devices. The terminal device may also include any image or video capturing devices, such as a digital camera, a video camera, a security camera, a vehicle on-board camera, and a stereo camera, etc., or any electronic device with a video function, such as a digital doorbell, an autonomous driving sensor, a digital voice assistant, a smart speaker, a smart appliance, or any industrial or commercial IoT systems with video processing capability. Any of the mobile device 102, terminal device 104, and electronic device 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

The network 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The network 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

The server 120 may include any type of server computer system or multiple computer systems configured in a server cluster or distributed in different locations. The server 120 may also include a cloud server on a cloud computing platform. The server 120 may also be referred as a server entity, which may be integrated with any appropriate device (including the electronic device) for performing the disclosed server-side functionalities of video decoding and application processing.

Figure 2:
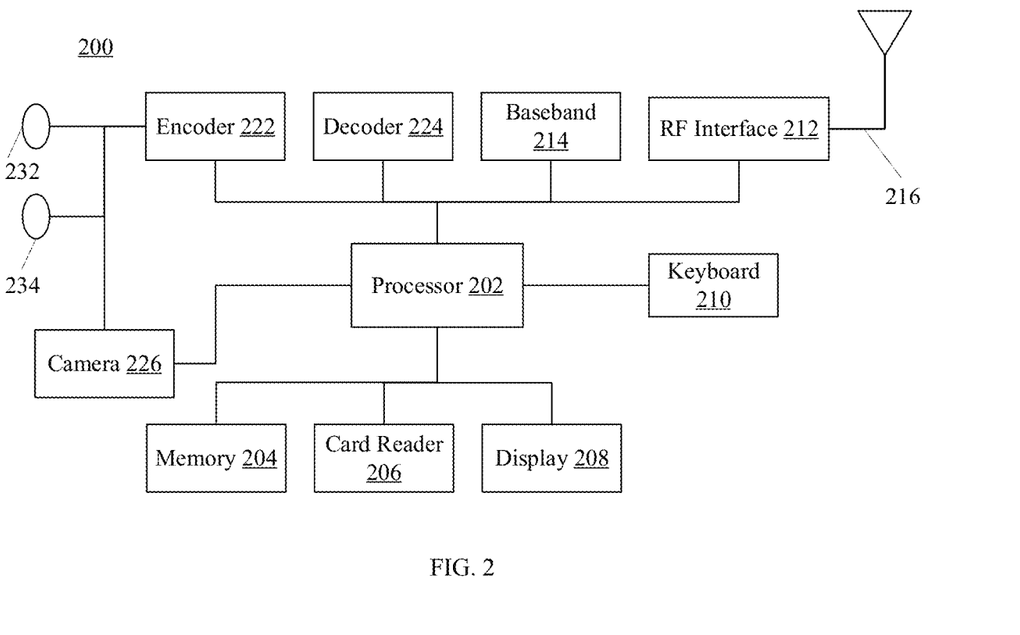
FIG. 2 illustrates a computer system consistent with embodiments of the present disclosure.

FIG. 2 illustrates an exemplary computer system implementing certain aspects of the variety of terminal devices 102, 104, and/or 106, and/or server 120. As shown in FIG. 2, the computer system 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the computer system 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user, and may also include other types of input/output devices. The speaker 232 and the microphone 234 may be used to input and output audio for the computer system 200.

The RF interface 212 (together with the antenna 216) may include RF circuitry for receiving and transmit RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the computer system 200 is a portable device carried by the user, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the computer system 200 suitable for carrying out coding and decoding of audio and/or video data or assisting in coding and decoding carried out by the processor 202.

The computer system 200 as shown in FIG. 2 may also include additional structures to implement any particular system. For example, the computer system 200 may include a database, and/or a land-line based network communication interface when implementing the server 120, or may include structures similar to those of a mobile terminal or user equipment of a wireless communication system when implementing the mobile device 102, etc. However, the computer system 200 may include or omit any structure to implement any electronic device or apparatus which may require encoding and decoding, or encoding or decoding video.

Returning to FIG. 1, the computer system 200 (i.e., any one or more of the variety of devices 102, 104, and/or 106) may capture or collect various data (e.g., audio data, environment/operating data, image data, and/or video data) and send the data to the server 120 through the network 140. The computer system 200 may process or pre-process the data before sending the data to the server 120, or may send the unprocessed data to the server 120.

During operation, a user of a terminal (i.e., computer system 200) may use a video application to transmit and/or receive video content to and/or from server 120, or users of the various terminal devices may use various video applications to communicate video content with each other. In one embodiment, one user may communicate video content with another user via the server 120, or the server 120 may set up the communication channel between the users, so that one user may direct communicate video with the other user via the communication channel.

Specifically, when the terminal receives video content, because the video content may be encoded bitstream, the terminal may use a video decoder (e.g., decoder 224) to decode the bitstream such that the encoded video content can be presented by the terminal to the user of the terminal. The video content may be from a variety of video applications, such as a video conference application, a video streaming application, a video security monitoring application, or any appropriate video applications.

Figure 3:
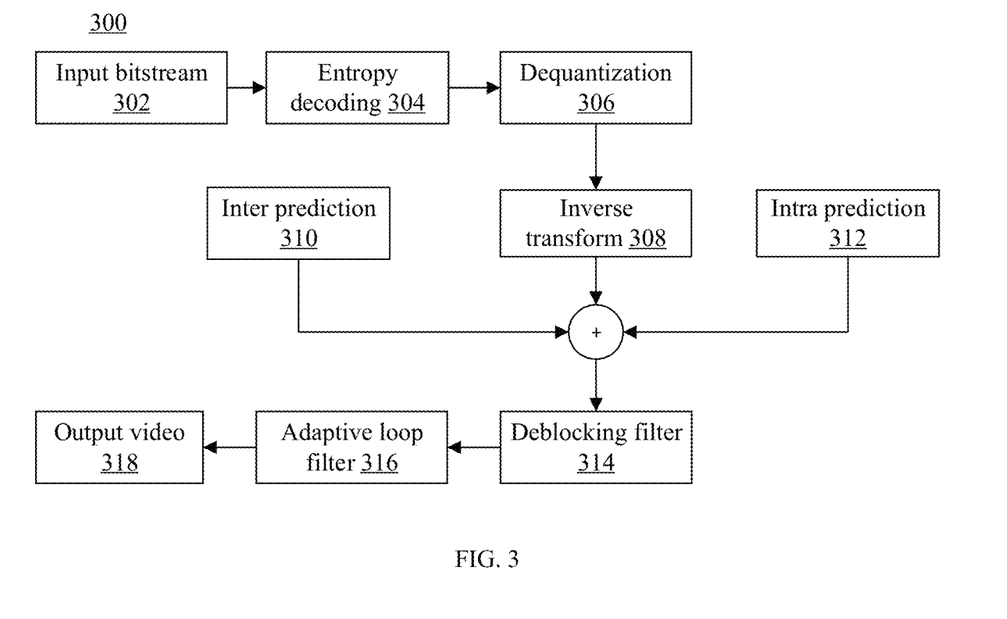
FIG. 3 illustrates an exemplary decoder structure during a decoding process consistent with embodiments of the present disclosure.

FIG. 3 illustrates an exemplary decoder structure during a decoding process consistent with the disclosed embodiments. As shown in FIG. 3, the video decoder 300 may include an input 302, an entropy decoding module 304, a dequantization module 306, an inverse transform module 308, an inter prediction module 310, an intra prediction module 312, a deblocking filter 314, an adaptive loop filter 316, and an output 318. Certain components may be omitted and other components may be added.

The input 302 may be provided to receive the bitstream to be decoded, and the output 318 is configured to output the decoded video picture/frame for further processing. The entropy decoding module 304 may receive the encoded bitstream and perform an initial decoding process, i.e., an entropy decoding process, on the encoded bitstream, when the bitstream may be entropy encoded. For example, an entropy encoder may create and assign a unique prefix-free code to each unique symbol that occurs in the original video content, and may then compress the video data by replacing each fixed-length data symbol with the corresponding variable-length prefix-free output codeword. The length of each codeword may be approximately proportional to the negative logarithm of the probability of occurrence of that codeword. On the other hand, the entropy decoder 304 may be a variable length decoder and may decompress the bitstream to provide entropy decoded video data.

The dequantization module 306 may be provided with the entropy decoded video data and perform a dequantization process, i.e., to dequantize the received video data. For example, the dequantization module 306 may obtain quantized coefficients and may descale the quantized coefficients. The video coder/decoder works by breaking the video frame (current frame) into discrete blocks (e.g., 8×8 pixels). These blocks can then be subject to discrete cosine transform (DCT) to calculate the frequency components, both horizontally and vertically. The resulting block (the same size as the original block) is then pre-multiplied by the quantization scale code and divided element-wise by the quantization matrix, and rounding each resultant element. The quantization matrix is designed to provide more resolution to more perceivable frequency components over less perceivable components (usually lower frequencies over high frequencies) in addition to transforming as many components to 0, which can be encoded with greatest efficiency. Other custom matrices may also be used. The extent of the reduction may be varied by changing the quantizer scale code, taking up much less bandwidth than a full quantizer matrix. From the decoder side, the quantized coefficients may then be descaled.

Further, the inverse transform module 308 may be configured to perform an inverse transformation on the video blocks inputted to the inverse transform module 308. For example, the inverse transform module 308 may perform an inverse discrete cosine transform (DCT) on the video blocks.

The inter prediction module 310 may reconstruct video blocks based on inter frame prediction. An inter coded frame is divided into blocks known as macroblocks. Instead of directly encoding the raw pixel values for each block, the encoder may try to find a block similar to the one it is encoding on a previously encoded frame, referred to as a reference frame. This process can be done by a block matching algorithm. If the encoder succeeds on its search, the block could be encoded by a vector, known as motion vector, which points to the position of the matching block at the reference frame. The process of motion vector determination is called motion estimation. On the decoding side, original blocks can be recovered or reconstructed based on the reference frame and the inter frame prediction.

Further, the intra prediction module 312 may reconstruct video blocks based on intra frame prediction. On the encoding side, intra-frame prediction exploits spatial redundancy, i.e., correlation among pixels within the current picture or current frame, by calculating prediction values through extrapolation from already coded pixels for effective delta coding, with no temporal processing performed outside of the current picture or frame. On the decoding side, original blocks can be recovered or reconstructed based on the current frame and the intra frame prediction.

Further, the deblocking filter 314 may be configured to deblock the fused video frame blocks from the inverse transform module 308, the inter prediction module 310, and/or the intra prediction module 312. That is, the outputs from the inverse transform module 308, the inter prediction module 310, and/or the intra prediction module 312 may be fused together to obtain reconstruction frame blocks, and may be further subject to the deblocking filter 314. The deblocking filter 314 may be a video filter applied to decoded compressed video to improve visual quality and prediction performance by smoothing the sharp edges which can form between macroblocks when block coding techniques are used. For example, the deblocking filter 314 may operate on the edges of each 4×4 or 8×8 transform block in the luma and chroma planes of each picture or frame. Each small block's edge is assigned a boundary strength based on whether it is also a macroblock boundary, the coding (intra/inter) of the blocks, whether references (in motion prediction and reference frame choice) differ, and whether it is a luma or chroma edge.

Further, the adaptive loop filter 316 may be configured to further improve image quality. For example, the adaptive loop filter 316 may minimize a mean square error between original pixels and decoded pixels using Wiener-based adaptive filter coefficients. The adaptive loop filter 316 may be located at the last processing stage of each picture/frame and can be regarded as a tool trying to catch and fix artifacts from previous stages. The suitable filter coefficients may be determined by the encoder and explicitly signaled to the decoder.

Figure 4:
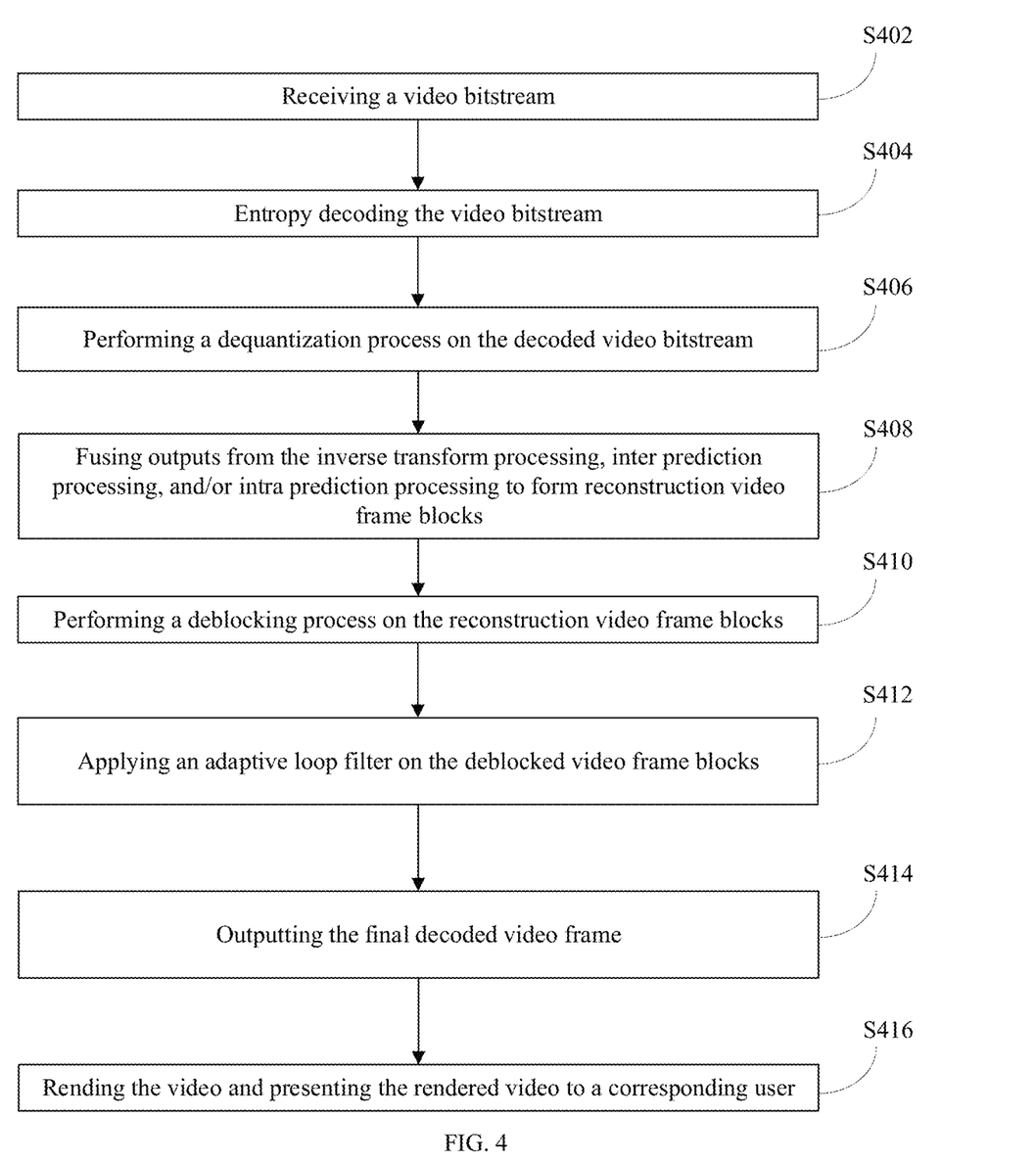
FIG. 4 illustrates an exemplary decoding process consistent with embodiments of the present disclosure.

FIG. 4 illustrates an exemplary decoding process consistent with the disclosed embodiments. The decoding process may be performed by the terminal (e.g., decoder 300) during video communication or other video application scenarios. As shown in FIG. 4, at the beginning of the decoding process, the terminal may receive an input bitstream containing video content (S402). The bitstream may include encoded original video content using one or more encoding schemes, such as entropy encoding. The video bitstream may be from any other terminal in communicating with the terminal, or may be from a server providing the video content. The video bitstream may also be from other sources, such as from a camera or video application on the terminal itself.

After receiving the video bitstream, the terminal may perform an initial decoding process, such as an entropy decoding process (S404). Although the entropy decoding process is used for illustration, other decoding schemes may also be used. The terminal may be signaled (e.g., extracting coding information from the bitstream or a separate signaling channel to recover coding parameters from the encoder providing the encoded bitstream) as to what type of coding scheme is used as well as other various coding parameters associated with the encoded bitstream.

Further, a dequantization process may be performed on the entropy decoded video data (S406). As the encoded video bitstream may be based on a hybrid coding approach combining motion-compensated prediction, intra-picture prediction, 2D transformation coding, loop filtering and adaptive entropy coding. The decoded video data may be further provided to several modules for processing. For example, an inverse transform module may be used to perform an inverse transform, an inter prediction module may be used to perform inter-picture prediction processing, and/or an intra prediction module may be used to perform intra-picture prediction processing. Any of the above listed processing may be omitted, and other processing may be added.

Figure 5:
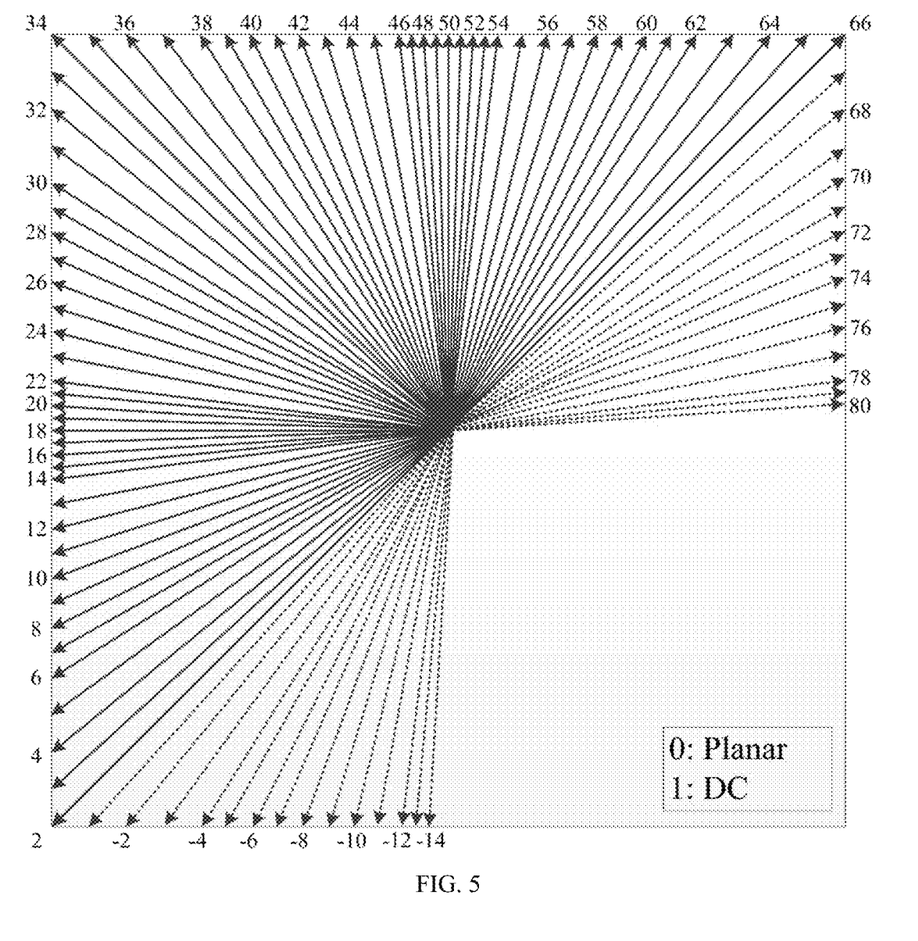
FIG. 5 illustrates various intra prediction modes and their corresponding directions consistent with embodiments of the present disclosure.

In certain embodiments, the intra prediction processing may be performed on the video blocks or samples inputted to the intra prediction module. Specifically, for the intra prediction processing, a plurality of intra prediction modes may be supported. FIG. 5 illustrates various intra prediction modes and their corresponding directions. As shown in FIG. 5, for example, a total 95 intra prediction modes may be included, where mode 18 is horizontal mode, mode 50 is vertical mode, and mode 2, mode 34 and mode 66 are diagonal modes. Modes −1~−14 and Modes 67~80 are called Wide-Angle Intra Prediction (WAIP) modes. In addition, a planar mode (mode 0) and a DC mode (mode 1) are also included.

To perform the intra-picture prediction process, the intra prediction module may obtain certain process parameters from signaling information provided by the encoder and/or the decoder. For example, the following table 1 shows syntax of corresponding SPS (seq_parametr_set_data( )) (i.e., SPS syntax), and parameters required to be available for decoding.

TABLE 1

| SPS syntax (with certain contents omitted for simplicity) | C | Descriptor |
|---|---|---|
| seq_parameter_set_data( ) { | | |
|   profile_idc | 0 | u(8) |
|   ... | 0 | u(8) |
|   seq_parameter_set_id | 0 | ue(v) |
|   if( profile_idc = = 100 \| \| profile_idc = = 110 \| \| | | |
|     profile_idc = = 122 \| \| profile_idc = = 244 \| \| profile_idc = = 44 \| \| | | |
|     profile_idc = = 83 \| \| profile_idc = = 86 \| \| profile_idc = = 118 \| \| | | |
|     profile_idc = = 128 ) { | | |
|     chroma_format_idc | 0 | ue(v) |
|     if( chroma_format_idc = = 3 ) | | |
|       separate_colour_plane_flag | 0 | u(1) |
|     bit_depth_luma_minus8 | 0 | ue(v) |
|     bit_depth_chroma_minus8 | 0 | ue(v) |
|     qpprime_y_zero_transform_bypass_flag | 0 | u(1) |
|     seq_scaling_matrix_present_flag | 0 | u(1) |
|     if( seq_scaling_matrix_present_flag ) | | |
|       for( i = 0; i < ( ( chroma_format_idc != 3 ) ? 8 : 12 ); i++ ) { | | |
|         seq_scaling_list_present_flag[ i ] | 0 | u(1) |
|         if( seq_scaling_list_present_flag[ i ] ) | | |
|           if( i < 6 ) | | |
|             scaling_list( ScalingList4x4[ i ], 16, UseDefaultScalingMatrix4x4Flag[ i ]) | 0 | |
|           else | | |
|             scaling_list( ScalingList8x8[ i − 6 ], 64, UseDefaultScalingMatrix8x8Flag[ i − 6 ] ) | 0 | |
|       } | | |
|   } | | |
|   ... | 0 | |
| } | | |

The semantics of bit_depth_luma_minus8 and bit_depth_chroma_minus8 may be explained below. The parameter bit_depth_luma_minus8 specifies the bit depth of the samples of the luma array and the value of the luma quantisation parameter range offset QpBdOffsetY, as specified by $$BitDepth Y = 8 + bit\_depth\_luma\_minus8 \quad (1)$$

$$QpBdOffset Y = 6 * bit\_depth\_luma\_minus8 \quad (2)$$

when bit_depth_luma_minus8 is not present, it shall be inferred to be equal to 0. bit_depth_luma_minus8 shall be in a certain range, for example, 0 to 6 inclusive.

The parameter bit_depth_chroma_minus8 specifies the bit depth of the samples of the chroma arrays and the value of the chroma quantisation parameter range offset QpBdOffsetC, as specified by $$BitDepth C = 8 + bit\_depth\_chroma\_minus8 \quad (3)$$

$$QpBdOffset C = 6 * bit\_depth\_chroma\_minus8 \quad (4)$$

when bit_depth_chroma_minus8 is not present, it shall be inferred to be equal to 0. bit_depth_chroma_minus8 shall be in a certain range, for example, 0 to 6 inclusive.

That is, these two SPS syntaxes, i.e., bit_depth_luma_minus8 and bit_depth_chroma_minus8 may define the operational bit depth for internal data processing throughout the codec, e.g., the reference sample data bit-depth, the prediction sample data bit-depth, the data representation bit-depth of Decoded Picture Buffer (DPB), etc. The same two syntax elements may always be signaled but the value is constrained for different profiles. For example, for HEVC Main profile, the values of these two syntaxes must be 0, while for Main 10 profile, the values of these two syntaxes should be in the range of 0 to 2 inclusive. Other values may also be used for different profiles.

According to the present disclosure, for intra prediction, instead of a fixed internal bit-depth operation mode, which is specified by the SPS syntaxes, i.e., bit_depth_luma_minus8 and bit_depth_chroma_minus8, in H.264/AVC High 10 profile, HEVC and VVC WD, a dynamic internal bit-depth (DIBD) technique may be used. The DIBD technique may allow different operational bit-depth for the data representation of the input (or output) of different modules of a video codec.

More specifically, the reference samples may be represented using a bit depth value specified by the high level syntax, i.e., bit_depth_luma_minus8 and bit_depth_chroma_ minus8. However, when performing the intra prediction, the reference samples are first represented using the specified bit depth value, and then right shifted to a certain bit depth K, K being an integer, and then the shifted reference samples are used for intra prediction processing.

In certain embodiments, the value of K may be a constant. For example, the value of K may be set as 8, 9, or 10. Other values may also be used. The constant value K may be set in advance, or may be signaled between the encoder and the decoder. In addition, the constant value K may be set by the terminal based on a specified requirement selected by the user or by other application(s).

Further, in some embodiments, when performing the right shift of the reference samples, a rounding operation may be applied, i.e., the reference samples are first added by an offset value offset=(1<<(D−K))>>1, where D is an integer and equal to (bit_depth_luma_minus8+8) or (bit_depth_chroma_minus8+8) depending on the color component of the current samples. Then, the reference samples are right shift by (D−K) bits, such that the output reference samples become K bits.

In certain other embodiments, the reference samples may be right shifted by N bits before doing the directional intra prediction, at the interpolation stage which involves a right shift R bits in the end to compensate the scaling of the interpolation filters, the right shift R is modified as R-N to compensate the right shift applied on the reference samples. N and R are integers.

Further, optionally and/or additionally, the right shifting (and/or rounding) may be only applied for directional intra prediction modes which involve fractional interpolation. For intra prediction directions which have integer slope, e.g., the prediction angle is arctan($2^M$), where M is integer values, e.g., −4, −3, −2, −1, 0, 1, 2, 4, and arctan(*) refers to the arctangent function.

In certain implementations, for example, for directional intra prediction processing, the K constant value may be set as 8 (other values may be similarly used), and the following specification for intra prediction mode may be provided as follows:

Specification of INTRA_ANGULAR2 . . . INTRA_ANGULAR66 intra prediction modes

Inputs to this process are:
  the intra prediction mode predModeIntra,
  a variable refIdx specifying the intra prediction reference line index,
  a variable nTbW specifying the transform block width,
  a variable nTbH specifying the transform block height,
  a variable refW specifying the reference samples width,
  a variable refH specifying the reference samples height,
  a variable nCbW specifying the coding block width,
  a variable nCbH specifying the coding block height,
  a variable refFilterFlag specifying the value of reference filter flag,
  a variable cIdx specifying the colour component of the current block,
  the neighbouring samples p[x][y], with x=−1−refIdx, y=−1−refIdx . . . refH−1 and x=−refIdx . . . refW−1, y=−1−refIdx.

Outputs of this process are the predicted samples predSamples[x][y], with x=0 . . . nTbW−1, y=0 . . . nTbH−1.

The variable nTbS is set equal to (Log 2(nTbW)+Log 2(nTbH))>>1.

The variable filterFlag is derived as follows:
  If one or more of the following conditions is true, filterFlag is set equal to 0.
    refFilterFlag is equal to 1
    refIdx is not equal to 0
    IntraSubPartitionsSplitType is not equal to ISP_NO_SPLIT
  Otherwise, the following applies:
    The variable minDistVerHor is set equal to Min(Abs(predModeIntra−50), Abs(predModeIntra−18)).
    The variable intraHorVerDistThres[nTbS] is specified in Table 8-7.
    The variable filterFlag is derived as follows:
      If minDistVerHor is greater than intraHorVerDistThres[nTbS] and refFilterFlag is equal to 0, filterFlag is set equal to 1.
      Otherwise, filterFlag is set equal to 0.
. . .

The values of the prediction samples predSamples[x][y], with x=0 . . . nTbW−1, y=0 . . . nTbH−1 are derived as follows:

If predModeIntra is greater than or equal to 34, the following ordered steps apply:
1. The reference sample array ref[x] is specified as follows:
   The following applies:

ref[x]=p[−1−refIdx+x][−1−refIdx], with x=0 . . . nTbW+refIdx+1

If intraPredAngle is less than 0, the main reference sample array is extended as follows:

ref[x]=p[−1−refIdx][−1−refIdx+Min((x*invAngle+ 256)>>9,nTbH)], with x=−nTbH . . . −1

Otherwise, ref[x]=p[−1−refIdx+x][−1−refIdx], with x=nTbW+2+ refIdx . . . refW+refIdx The additional samples ref[refW+refIdx+x] with x=1 . . . (Max(1, nTbW/nTbH)*refIdx+2) are derived as follows:

ref[refW+refIdx+x]=p[−1+refW][−1−refIdx]

2. The values of the prediction samples predSamples[x][y], with x=0 . . . nTbW−1, y=0 . . . nTbH−1 are derived as follows:
   rs=((cIdx==0)? BitDepth$_Y$: BitDepth$_C$)−8
   r=((1<<rs)>>1)
   The index variable iIdx and the multiplication factor iFact are derived as follows:

iIdx=(((y+1+refIdx)*intraPredAngle)>>5)+refIdx iFact=((y+1+refIdx)*intraPredAngle)& 31

If cIdx is equal to 0, the following applies:
      The interpolation filter coefficients fT[j] with j=0 . . . 3 are derived as follows:

fT[j]=filterFlag?fG[iFact][j]: fC[iFact][j]

The value of the prediction samples predSamples[x][y] is derived as follows:
      If iFact is not equal to 0 and filterFlag is true, predSamples[x][y]=Clip1Y(((Σ$_{i=0}^{3}$fT[i]*(ref[y+iIdx+ i]+r)>>rs)+32)>>(6−rs))(−)

Otherwise predSamples[x][y]=Clip1Y(((Σ$_{i=0}^{3}$fT[i]*ref[x+iIdx+ i])+32)>>6)

Otherwise (cIdx is not equal to 0), depending on the value of iFact, the following applies:
      If iFact is not equal to 0, the value of the prediction samples predSamples[x][y] is derived as follows:

predSamples[x][y]=((32−iFact)*(ref[x+iIdx+1]+ rs)>>r+iFact*(ref[x+iIdx+2]+rs)>>r+ (16>>r))>>(5−r)

Otherwise, the value of the prediction samples pred-Samples[x][y] is derived as follows:

predSamples[x][y]=ref[x+iIdx+1]

Otherwise (predModeIntra is less than 34), the following ordered steps apply:
1. The reference sample array ref[x] is specified as follows:
   The following applies:

ref[x]=p[−1−refIdx][−1−refIdx+x], with x=0 . . . nTbH+refIdx+1

If intraPredAngle is less than 0, the main reference sample array is extended as follows:

ref[x]=p[−1−refIdx+Min((x*invAngle+256)>>9, nTbW)][−1−refIdx], with x=nTbW . . . −1

Otherwise, ref[x]=p[−1−refIdx][−1−refIdx+x], with x=nTbH+2+ refIdx . . . refH+refIdx The additional samples ref[refH+refIdx+x] with x=1 . . . (Max(1, nTbW/nTbH)*refIdx+2) are derived as follows:

ref[refH+refIdx+x]=p[−1+refH][−1−refIdx]

2. The values of the prediction samples predSamples[x][y], with x=0 . . . nTbW−1, y=0 . . . nTbH−1 are derived as follows:
   The index variable iIdx and the multiplication factor iFact are derived as follows:

iIdx=(((x+1+refIdx)*intraPredAngle)>>5)+refIdx iFact=((x+1+refIdx)*intraPredAngle)& 31

If cIdx is equal to 0, the following applies:
      The interpolation filter coefficients fT[j] with j=0 . . . 3 are derived as follows:

fT[j]=filterFlag?fG[iFact][j]: fC[iFact][j]

The value of the prediction samples predSamples[x][y] is derived as follows:
      If iFact is not equal to 0 and filterFlag is true, predSamples[x][y]=Clip1Y(((Σ$_{i=0}^{3}$fT[i]*(ref[y+iIdx+ i]+r)>>rs)+32)>>(6−rs))(−)

Otherwise, predSamples[x][y]=Clip1Y(((Σ$_{i=0}^{3}$fT[i]*ref[y+iIdx+ i])+32)>>6)

Otherwise (cIdx is not equal to 0), depending on the value of iFact, the following applies:
      If iFact is not equal to 0, the value of the prediction samples predSamples[x][y] is derived as follows:

predSamples[x][y]=((32−iFact)*(ref[y+iIdx+1]+ rs)>>r+iFact*(ref[y+iIdx+2]+rs)>>r+ (16>>r))>>(5−r)

Otherwise, the value of the prediction samples pred-Samples[x][y] is derived as follows:

predSamples[x][y]=ref[y+iIdx+1]

In some embodiments, when doing the planar mode intra prediction, the reference samples may be right shifted by (D−K) bits, where D is equal to (bit_depth_luma_minus8+8) or (bit_depth_chroma_minus8+8) depending on the color component of the current samples, such that the reference samples used for generating Planar prediction become K bits.

Additionally or optionally, the reference samples may be right shifted by N bits before doing the planar intra prediction, at the interpolation stage which involves a right shift R bits in the end to compensate the scaling of the interpolation filters, the right shift R is modified as R-N to compensate the right shift applied on the reference samples.

In certain other implementations, for example, for planar intra prediction processing, the K constant value may be set as 8, and the following specification for intra prediction mode may be provided as follows:

Specification of INTRA_PLANAR intra prediction mode
Inputs to this process are:
   a variable cIdx specifying the colour component of the current block,
   a variable nTbW specifying the transform block width,
   a variable nTbH specifying the transform block height,
   the neighbouring samples p[x][y], with x=−1, y=−1 . . . nTbH and x=0 . . . nTbW, y=−1.
Outputs of this process are the predicted samples predSamples[x][y], with x=0 . . . nTbW−1, y=0 . . . nTbH−1. The variables nW and nH are derived as follows:

$$nW = \mathrm{Max}(nTbW, 2)$$

$$nH = \mathrm{Max}(nTbH, 2)$$

$$rs = ((cIdx == 0)?\mathrm{BitDepth}_Y : \mathrm{BitDepth}_C) - 8$$

$$r = ((1 << rs) >> 1)$$

The values of the prediction samples predSamples[x][y], with x=0 . . . nTbW−1 and y=0 . . . nTbH−1, are derived as follows:

$$predV[x][y] = ((nH-1-y)*((p[x][-1]+r)>>rs)+(y+1)*((p[-1][nTbH]+r)>>rs))<<\mathrm{Log}\,2(nW)$$

$$predH[x][y] = ((nW-1-x)*((p[-1][y]+r)>>rs)+(x+1)*((p[nTbW][-1]+r)>>rs))<<\mathrm{Log}\,2(nH)$$

$$predSamples[x][y] = (predV[x][y]+predH[x][y]+(nW*nH>>rs))>>(\mathrm{Log}\,2(nW)+\mathrm{Log}\,2(nH)+1-rs)$$

Further, in some embodiments, when doing the MIP prediction, the reference samples are right shift by (D−K) bits, where D is equal to (bit_depth_luma_minus8+8) or (bit_depth_chroma_minus8+8) depending on the color component of the current samples, such that the reference samples used for generating Planar prediction become K bits.

Thus, according to the disclosed embodiments, the terminal may obtain the parameter bit_depth_luma_minus8 and the parameter bit_depth_chroma_minus8 from the signaling information (e.g., sequence parameter set (SPS)). Further, based on the signaling information, the terminal may determine an internal bit-depth K for adjusting the bit depth specified by the bit_depth_luma_minus8 and the bit depth specified by the bit_depth_chroma_minus8. That is, a dynamic internal bit depth may be created by adjusting the fixed values specified by the bit_depth_luma_minus8 and bit_depth_chroma_minus8 with the internal bit-depth K. As K may be determined based on various conditions or stages of the decoding processing, the bit depth for performing various decoding processing may be dynamically set. That is, the decoding processing may be performed using the bit depth specified by the bit_depth_luma_minus8 and the bit depth specified by the bit_depth_chroma_minus8, together with the internal bit-depth K set dynamically, for both luma and chroma samples. In other words, the bit depths are no longer fixed for decoding processing. Rather, the internal bit-depth K may be used together with the fixed bit depths to effect an improved dynamic internal bit depth to improve processing efficiency, achieving dynamic internal bit depths.

Returning to FIG. 4, after the inverse transform processing, inter prediction processing, and/or intra prediction processing, outputs from the inverse transform module, the inter prediction module, and/or an intra prediction module may be fused together to form fused video frame blocks (S408).

The fused frame blocks may also be referred as reconstruction samples, and a deblocking process may be performed on the video frame blocks fused from the inverse transform processing, inter prediction processing, and/or intra prediction processing (S410). For example, a deblocking filter may be applied on the reconstruction samples.

Figure 6:
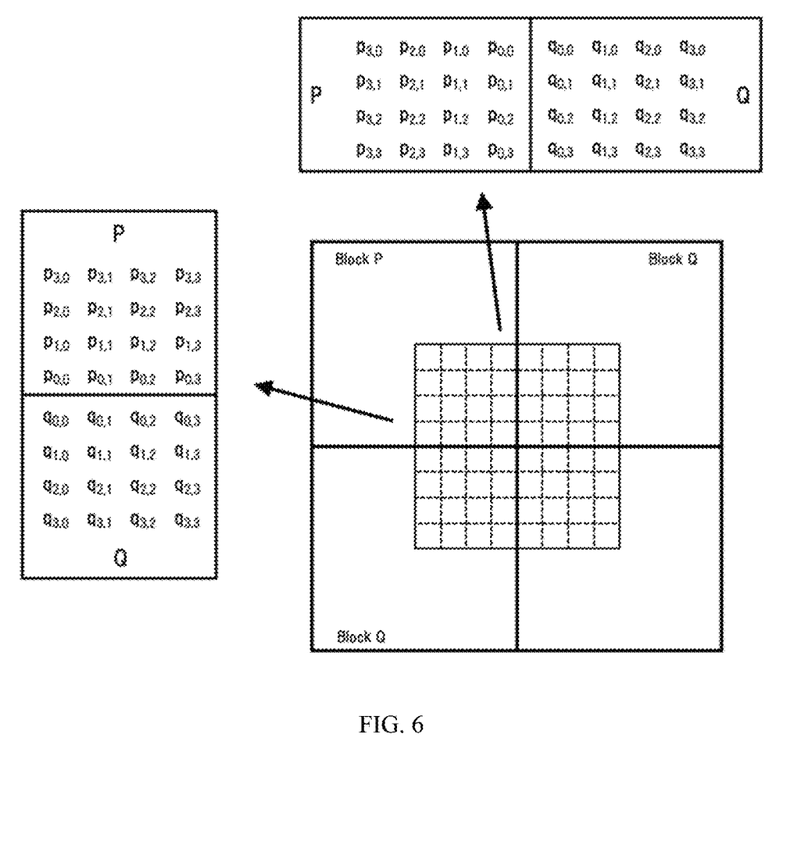
FIG. 6 illustrates deblocking processing sample position of $p_{i,k}$ and $q_{i,k}$ consistent with embodiments of the present disclosure.

The filter strength of the deblocking filter may be controlled by the variables β and $t_C$ which are derived from the averaged quantization parameters $qP_L$. The deblocking filter may control the strength of the deblocking filter by adding offset to $qP_L$ according to the luma level of the reconstruction samples. The reconstructed luma level LL is derived as follow:

$$LL = ((p_{0,0}+p_{0,3}+q_{0,0}+q_{0,3})>>2)/(1<<\mathrm{bitDepth}) \quad (5)$$

where, the sample values $p_{i,k}$ and $q_{i,k}$ with i=0 . . . 3 and k=0 and 3 are derived as shown in FIG. 6, which illustrates sample position of $p_{i,k}$ and $q_{i,k}$.

The variable $qP_L$ is derived as follows:

$$qPL = ((QpQ+QpP+1)>>1)+qp\mathrm{Offset} \quad (6)$$

where QpQ and QpP denote the quantization parameters of the coding units containing the sample q0,0 and p0,0, respectively. The offset qpOffset dependent on transfer function, the values are signaled in the SPS.

Maximum QP may be set as a constant values, such as 63 or other desired value. Values of deblocking parameters tC based on the block QP may be derived from the deblocking table. Further, the deblocking table may be adapted to 10-bit video. For example, the following is updated tC table to accommodate the extension of the QP range and 10-bit video.

tC=[0, 0, 0, 0, 0, 0, 0, 0, 0, 0, 0, 0, 0, 0, 0, 0, 0, 3, 4, 4, 4, 4, 5, 5, 5, 5, 7, 7, 8, 9, 10, 10, 11, 13, 14, 15, 17, 19, 21, 24, 25, 29, 33, 36, 41, 45, 51, 57, 64, 71, 80, 89, 100, 112, 125, 141, 157, 177, 198, 222, 250, 280, 314, 352, 395]

Further, in one embodiment, an 8×8 deblocking grid may be used for both luma and chroma. In another embodiment, deblocking on a 4×4 grid for luma boundaries may be used to handle blocking artifacts from rectangular transform shapes. Parallel friendly luma deblocking on a 4×4 grid can be achieved by restricting the number of samples to be deblocked to 1 sample on each side of a vertical luma boundary where one side has a width of 4 or less or to 1 sample on each side of a horizontal luma boundary where one side has a height of 4 or less.

In certain embodiments, for performing the deblocking process, input reconstruction samples may be represented using a bit depth specified by the high level syntax, i.e., bit_depth_luma_minus8 and bit_depth_chroma_minus8. Further, when doing the deblocking, the input reconstruction samples are first right shift to a certain bit depth K, and then the shifted reconstruction samples are used for performing the deblocking.

In some embodiments, the value of K is a constant. For example, the value of K may include 8, 9, or 10. Other values may also be used. Further, when doing the right shift of the input reconstruction samples, a rounding operation is applied, i.e., the input reconstruction samples are first added by an offset value offset=(1<<(D−K))>>1, where D is equal to (bit_depth_luma_minus8+8) or (bit_depth_chroma_minus8+8) depending on the color component of the current samples. Then the reconstruction samples are right shift by (D−K) bits, such that the output samples become K bits.

In certain embodiments, when doing the right shift of the input samples, a rounding operation is applied, i.e., the input samples are first added by an offset value offset=(1<<(D−K))>>1, where D is equal to (bit_depth_luma_minus8+8) or (bit_depth_chroma_minus8+8) depending on the color component of the current samples. Then the input samples are right shift by (D−K) bits, such that the output samples become K bits.

Figure 7:
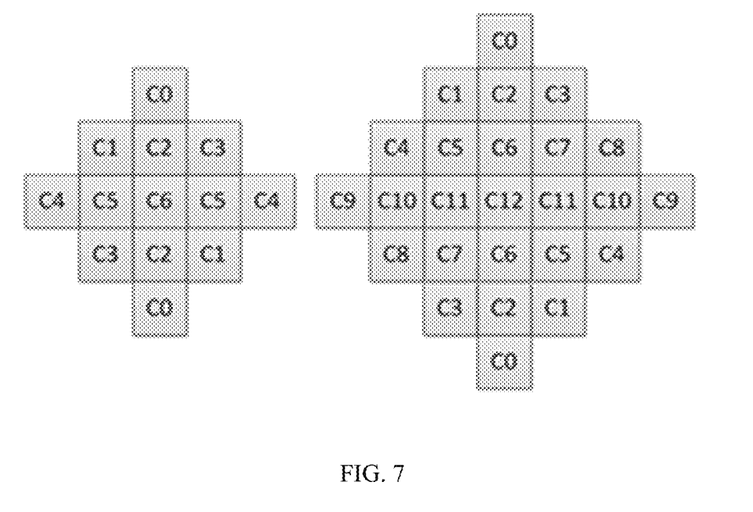
FIG. 7 illustrates adaptive loop filter (ALF) filter shapes of a 5×5 diamond for chroma, and a 7×7 diamond for luma consistent with embodiments of the present disclosure.

Returning to FIG. 4, further, an adaptive loop filter (ALF) may be further applied on the video frame blocks (S412). For example, two diamond filter shapes, as shown in FIG. 7, are used. FIG. 7 illustrates a 5×5 diamond shape on the left, and a 7×7 diamond shape on the right. The 7×7 diamond shape may be applied for luma component and the 5×5 diamond shape may be applied for chroma components.

That is, an ALF with block-based filter adaption is applied as an example. For the luma component, one among 25 filters is selected for each 4×4 block, based on the direction and activity of local gradients.

In certain embodiments, before filtering each 4×4 luma block, geometric transformations such as rotation or diagonal and vertical flipping may be applied to the filter coefficients f(k,l) and to the corresponding filter clipping values c(k,l) depending on gradient values calculated for that block. This is equivalent to applying these transformations to the samples in the filter support region. The idea is to make different blocks to which ALF is applied more similar by aligning their directionality.

ALF filter parameters may be signaled in adaptation parameter set (APS). In one APS, up to 25 sets of luma filter coefficients and clipping value indexes, and up to eight sets of chroma filter coefficients and clipping value indexes could be signaled. To reduce bits overhead, filter coefficients of different classification for luma component can be merged. In slice header, the indices of the APSs used for the current slice are signaled.

Clipping value indexes, which are decoded from the APS, may allow determining clipping values using a Luma table of clipping values and a Chroma table of clipping values. These clipping values are dependent of the internal bit-Depth. More precisely, the Luma table of clipping values and Chroma table of clipping values are obtained by the following formulas:

$$AlfClipL = \{\text{round}(2^{B\frac{N-n+1}{N}}) \text{ for } n \in [1\ldots N]\}, \quad (7)$$

$$AlfClipC = \{\text{round}(2^{(B-8)+8\frac{(N-n)}{N-1}}) \text{ for } n \in [1\ldots N]\} \quad (8)$$

where B equal to the internal bitDepth and N equal to the number of allowed clipping values (for example, 4). Table 2 below shows the output of equations (7) and (8).

TABLE 3

Specification AlfClip depending on bitDepth and clipIdx

| bitDepth | clipIdx | | | |
|---|---|---|---|---|
| | 0 | 1 | 2 | 3 |
| 8 | 255 | 64 | 16 | 4 |
| 9 | 511 | 108 | 23 | 5 |
| 10 | 1023 | 181 | 32 | 6 |
| 11 | 2047 | 304 | 45 | 7 |
| 12 | 4095 | 512 | 64 | 8 |
| 13 | 8191 | 861 | 91 | 10 |
| 14 | 16383 | 1448 | 128 | 11 |
| 15 | 32767 | 2435 | 181 | 13 |
| 16 | 65535 | 4096 | 256 | 16 |

Further, in slice header, up to 7 APS indices can be signaled to specify the luma filter sets that are used for the current slice. The filtering process can be further controlled at CTB level. A flag is always signaled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

For chroma component, an APS index is signaled in slice header to indicate the chroma filter sets being used for the current slice. At CTB level, a filter index is signaled for each chroma CTB if there is more than one chroma filter set in the APS.

The filter coefficients are quantized with norm equal to 128. In order to restrict the multiplication complexity, a bitstream conformance is applied so that the coefficient value of the non-central position may be in the range of −2⁷ to 2⁷−1, inclusive. The central position coefficient is not signaled in the bitstream and is considered as equal to 128.

Further, the syntaxes and semantics of clipping index and values are defined as follows.

The alf_luma_clip_idx[sfIdx][j] specifies the clipping index of the clipping value to use before multiplying by the j-th coefficient of the signalled luma filter indicated by sfIdx. It is a requirement of bitstream conformance that the values of alf_luma_clip_idx[sfIdx][j] with sfIdx=0 . . . alf_luma_num_filters_signalled_minus1 and j=0 . . . 11 shall be in the range of 0 to 3, inclusive.

The luma filter clipping values AlfClipL[adaptation_parameter_set_id] with elements AlfClipL[adaptation_parameter_set_id][filtIdx][j], with filtIdx=0 . . . NumAlfFilters−1 and j=0 . . . 11 are derived as specified in Table 2 depending on bitDepth set equal to BitDepthY and clipIdx set equal to alf_luma_clip_idx[alf_luma_coeff_delta_idx[filtIdx]][j].

The alf_chroma_clip_idx[altIdx][j] specifies the clipping index of the clipping value to use before multiplying by the j-th coefficient of the alternative chroma filter with index altIdx. It is a requirement of bitstream conformance that the values of alf_chroma_clip_idx[altIdx][j] with altIdx=0 . . . alf_chroma_num_alt_filters_minus1, j=0 . . . 5 shall be in the range of 0 to 3, inclusive.

The chroma filter clipping values AlfClipC[adaptation_parameter_set_id][altIdx] with elements AlfClipC[adaptation_pammeter_set_id][altIdx][j], with altIdx=0 . . . alf_chroma_num_alt_filters_minus1, j=0 . . . 5 are derived as specified in Table 2 depending on bitDepth set equal to BitDepthC and clipIdx set equal to alf_chroma_clip_idx[altIdx][j].

In certain embodiments, for performing the ALF process, input samples are represented using a bit depth value specified by the high level syntax, i.e., bit_depth_luma_minus8 and bit_depth_chroma_minus8. Further, when doing the ALF processing, the input samples are first right shift to a certain bit depth K, and then the shifted input samples are used for performing the ALF.

In some embodiments, only when calculating the ALF classification, input samples are represented using a bit depth specified by the high level syntax, i.e., bit_depth_luma_minus8 and bit_depth_chroma_minus8. Further, when doing the filtering, the input samples are first right shift to a certain bit depth K, and then the shifted samples are used for performing the ALF classification.

Additionally or alternatively, only when calculating the ALF filtering, input samples are represented using a bit depth specified by the high level syntax, i.e., bit_depth_luma_minus8 and bit_depth_chroma_minus8, however, when doing the ALF processing, the input samples are first right shift to a certain bit depth K, and then the shifted samples are used for performing the ALF filtering.

In certain embodiments, the value of K may be a constant. For example, the value of K may include 8, 9, or 10. Other values may also be used. In some embodiments, when doing the right shift of the input samples, a rounding operation is applied, i.e., the input samples are first added by an offset value offset=(1<<(D−K))>>1, where D is equal to (bit_depth_luma_minus8+8) or (bit_depth_chroma_minus8+8) depending on the color component of the current samples. Then the input samples are right shift by (D−K) bits, such that the output samples become K bits.

Alternatively or additionally, a cross-component adaptive loop filter (CCALF) may be performed. The CCALF operates by applying a linear, diamond shaped filter to the luma channel for each chroma component. The filter coefficients can be transmitted in the APS, scaled by a factor of 210, and rounded for fixed point representation. The application of the filters is controlled on a variable block size and signaled by a context-coded flag received for each block of samples. The block size along with an CCALF enabling flag is received at the slice-level for each chroma component. Supported block sizes (in chroma samples) may include 16×16, 32×32, 64×64, etc.

According to the present disclosure, for performing the CCALF process, input samples may be represented using a bit depth value specified by the high level syntax, i.e., bit_depth_luma_minus8 and bit_depth_chroma_minus8. Further, when doing the filtering, the input samples are first right shift to a certain bit depth K, and then the shifted input samples are used for performing the CCALF.

In certain embodiments, only when performing the CCALF processing, the input samples are represented using a bit depth specified by the high level syntax, i.e., bit_depth_luma_minus8 and bit_depth_chroma_minus8. When doing the CCALF processing, the input samples are first right shift to a certain bit depth K, and then the shifted samples are used for performing the CCALF filtering.

In some embodiments, the value of K may be a constant. For example, the value of K may include 8, 9, or 10.

Further, when doing the right shift of the input samples, a rounding operation may be applied, i.e., the input samples are first added by an offset value offset=(1<<(D−K))>>1, where D is equal to (bit_depth_luma_minus8+8) or (bit_depth_chroma_minus8+8) depending on the color component of the current samples. Then the input samples are right shift by (D−K) bits, such that the output samples become K bits.

In certain implementations, for example, for CCALF processing, the K constant value may be set as 8, and the following specification for CCALF processing may be provided as follows:
Specification of Cross-component filtering process
. . .
  The variable shift1 and offset1 are derived as follows shift1=BitDepth$_Y$−8 offset1=(1<<shift1)>>1 shift2=7−(BitDepth$_C$−8)

. . .
  The variable sum is derived as follows:

sum=f[0]*((recPicture$_L$[h$_x$,v$_{y+yM2}$]+offset1)>>shift1)+
  f[1]*((recPicture$_L$[h$_{x+xM1}$,v$_{y+yM1}$]+offset1)
  >>shift1)+f[2]*((recPicture$_L$[h$_x$,v$_{y+yM1}$]+offset1)
  >>shift1)+f[3]*((recPicture$_L$[h$_{x+xP1}$,v$_{y+yM1}$]+
  offset1)>>shift1)+f[4]*((recPicture$_L$[h$_{x+xM2}$,v$_y$]+
  offset1)>>shift1)+f[5]*((recPicture$_L$[h$_{x+xM1}$,v$_y$]+
  offset1)>>shift1)+f[6]*((recPicture$_L$[h$_x$,v$_y$]+
  offset1)>>shift1)+f[7]*((recPicture$_L$[h$_{x+xP1}$,v$_y$]+
  offset1)>>shift1)+f[4]*((recPicture$_L$[h$_{x+xP2}$,v$_y$]+
  offset1)>>shift1)+f[4]*((recPicture$_L$
  [h$_{x+xM2}$,v$_{y+yP1}$]+offset1)>>shift1)+f[8]*((recPicture$_L$[h$_{x+xM1}$,v$_{y+yP1}$]+offset1)>>shift1)+f[9]*
  ((recPicture$_L$[h$_x$,v$_{y+yP1}$]+offset1)>>shift1)+f[10]*
  ((recPicture$_L$[h$_{x+xP1}$,v$_{y+yP1}$]+offset1)>>shift1)+f
  [4]*((recPicture$_L$[h$_{x+xP2}$,v$_{y+yP1}$]+offset1)
  >>shift1)+f[11]*((recPicture$_L$[h$_{x+xM1}$,v$_{y+yP2}$]+
  offset1)>>shift1)+f[12]*((recPicture$_L$[h$_x$,v$_{y+yP2}$]+
  offset1)>>shift1)+f[13]*((recPicture$_L$
  [h$_{x+xP1}$,v$_{y+yP2}$]+offset1)>>shift1)+f[0]*((recPicture$_L$[h$_x$,v$_{y+yP3}$]+offset1)>>shift1)

sum=curr+(sum+((1<<shift2)>>1))>>shift2)

Returning to FIG. 4, the final decoded video frame blocks may be outputted by the decoder (S414). The terminal may further render the decoded video contents based on the decoded video frame blocks and, optionally, signaling information from the encoding side, and may further present the rendered to the user of the terminal (S414). The terminal may also present the rendered video contents to other programs or applications for further processing, such as image analysis or pattern detection, etc.

By using the disclosed methods and systems, instead of a fixed internal bit-depth operation mode, which is specified by the SPS syntaxes, i.e., bit_depth_luma_minus8 and bit_depth_chroma_minus8, in H.264/AVC High 10 profile, HEVC and VVC WD, a dynamic internal bit-depth (DIBD) technique can be used to allows different operational bit-depth for the data representation of the input (or output) of different modules of a video codec.

Further, the disclosed various processing steps and components may be used separately or combined in any order. The methods (or embodiments), encoder, and decoder may be implemented by hardware processing circuitry (e.g., one or more processors or one or more integrated circuits), as well as software programs (e.g., computer program instructions executable by the hardware processor(s)).

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. Thus, the content of the specification should not be construed as a limitation to the present disclosure.

What is claimed is:
1. A video decoding method, comprising:
  obtaining an encoded bitstream of an original video content;
  obtaining signaling information associated with the encoded bitstream, wherein the signaling information includes at least a sequence parameter set (SPS), and the SPS includes a parameter bit_depth_luma_minus8, which specifies a bit depth of samples of a luma array and a value of a luma quantization parameter range offset; and a parameter bit_depth_chroma_minus8, which specifies a bit depth of samples of a chroma array and a value of a chroma quantization parameter range offset;
  determining an internal bit-depth K for adjusting the bit depth specified by the bit_depth_luma_minus8 and the bit depth specified by the bit_depth_chroma_minus8;

performing a decoding process on the encoded bitstream, based the signaling information and using the bit_depth_luma_minus8 and the bit_depth_chroma_minus8, together with the internal bit-depth K, to recover the original video content; and presenting the original video content, wherein:

the decoding process includes intra prediction processing;

reference samples for the intra prediction processing are first represented using the bit depth specified by the bit_depth_luma_minus8 and the bit depth specified by the bit_depth_chroma_minus8, and then the reference samples are right shifted by K for the intra prediction processing;

during the right shift of the reference samples, a rounding operation is applied, such that the reference samples are first added by an offset value offset=(1<<(D−K))>>1, where D is an integer equal to (bit_depth_luma_minus8+8) or (bit_depth_chroma_minus8+8) depending on a color component of a current sample; and the reference samples are right shifted by (D−K) bits, such that output reference samples become K bits.

2. The method according to claim 1, wherein K is a constant having a value of 8, 9, or 10.

3. The method according to claim 1, wherein:

the right shifting of the reference samples by (D−K) bits is only applied for directional intra prediction modes which involve fractional interpolation.

4. The method according to claim 1, wherein:

when performing a matrix-based intra prediction, the reference samples are right shifted by (D−K) bits, where D is an integer equal to (bit_depth_luma_minus8+8) or (bit_depth_chroma_minus8+8) depending on a color component of a current sample, such that the reference samples used for generating planar prediction become K bits.

5. The method according to claim 1, wherein, provided that N and R are integers, the reference samples are right shifted by N bits for performing a directional intra prediction; and at end of an interpolation stage which originally involves a right shift of R bits to compensate scaling of interpolation filters, the R is modified as R-N to compensate the right shift applied on the reference samples.

6. The method according to claim 1, wherein:

the decoding process includes deblocking processing; and input reconstruction samples for deblocking processing are first represented using the bit depth specified by the bit_depth_luma_minus8 and the bit depth specified by the bit_depth_chroma_minus8, and then the shifted reconstruction samples are right shifted by K for the deblocking processing.

7. The method according to claim 6, wherein K is a constant having a value of 8, 9, or 10.

8. The method according to claim 6, wherein:

during the right shift of the input reconstruction samples, a rounding operation is applied, such that the reconstruction samples are first added by an offset value offset=(1<<(D−K))>>1, where D is an integer equal to (bit_depth_luma_minus8+8) or (bit_depth_chroma_minus8+8) depending on a color component of a current reconstruction sample; and the reconstruction samples are right shifted by (D−K) bits, such that output samples become K bits.

9. The method according to claim 1, wherein:

the decoding process includes adaptive loop filter (ALF) processing; and input samples for ALF processing are first represented using the bit depth specified by the bit_depth_luma_minus8 and the bit depth specified by the bit_depth_chroma_minus8, and then the input samples are right shifted by K for the ALF processing.

10. The method according to claim 9, wherein K is a constant having a value of 8, 9, or 10.

11. The method according to claim 9, wherein:

during the right shift of the input samples, a rounding operation is applied, such that the input samples are first added by an offset value offset=(1<<(D−K))>>1, where D is an integer equal to (bit_depth_luma_minus8+8) or (bit_depth_chroma_minus8+8) depending on a color component of a current sample; and the input samples are right shifted by (D−K) bits, such that output samples become K bits.

12. The method according to claim 1, wherein:

the decoding process includes cross-component adaptive loop filter (CCALF) processing; and input samples for the CCALF processing are first represented using the bit depth specified by the bit_depth_luma_minus8 and the bit depth specified by the bit_depth_chroma_minus8, and then the input samples are right shifted by K for the CCALF processing.

13. The method according to claim 12, wherein K is a constant having a value of 8, 9, or 10.

14. The method according to claim 12, wherein:

during the right shift of the input samples, a rounding operation is applied, such that the input samples are first added by an offset value offset=(1<<(D−K))>>1, where D is an integer equal to (bit_depth_luma_minus8+8) or (bit_depth_chroma_minus8+8) depending on a color component of a current sample; and the input samples are right shifted by (D−K) bits, such that output samples become K bits.

15. A terminal, comprising:

a memory storing computer program instructions; and a processor coupled to the memory and, when executing the computer program instructions, configured to perform:

obtaining an encoded bitstream of an original video content;

obtaining signaling information associated with the encoded bitstream, wherein the signaling information includes at least a sequence parameter set (SPS), and the SPS includes: a parameter bit_depth_luma_minus8, which specifies a bit depth of samples of a luma array and a value of a luma quantization parameter range offset; and a parameter bit_depth_chroma_minus8, which specifies a bit depth of samples of a chroma array and a value of a chroma quantization parameter range offset;

determining an internal bit-depth K for adjusting the bit depth specified by the bit_depth_luma_minus8 and the bit depth specified by the bit_depth_chroma_minus8;

performing a decoding process on the encoded bitstream, based the signaling information and using the bit_depth_luma_minus8 and the bit_depth_chroma_minus8, together with the internal bit-depth K, to recover the original video content; and presenting the original video content, wherein:

the decoding process includes intra prediction processing;

reference samples for the intra prediction processing are first represented using the bit depth specified by the bit_depth_luma_minus8 and the bit depth specified by the bit_depth_chroma_minus8, and then the reference samples are right shifted by K for the intra prediction processing;

during the right shift of the reference samples, a rounding operation is applied, such that the reference samples are first added by an offset value offset=(1<<(D−K))>>1, where D is an integer equal to (bit_depth_luma_minus8+8) or (bit_depth_chroma_minus8+8) depending on a color component of a current sample; and the reference samples are right shifted by (D−K) bits, such that output reference samples become K bits.

16. The terminal according to claim 15, wherein K is a constant having a value of 8, 9, or 10.

17. The terminal according to claim 15, wherein:

the decoding process includes deblocking processing; and input reconstruction samples for deblocking processing are first represented using the bit depth specified by the bit_depth_luma_minus8 and the bit depth specified by the bit_depth_chroma_minus8, and then the shifted reconstruction samples are right shifted by K for the deblocking processing.

\* \* \* \* \*